US011109291B2

(12) United States Patent
Yi et al.

(10) Patent No.: US 11,109,291 B2
(45) Date of Patent: Aug. 31, 2021

(54) METHOD FOR PERFORMING HANDOVER IN WIRELESS COMMUNICATION SYSTEM AND DEVICE FOR SAME

(71) Applicant: LG ELECTRONICS INC., Seoul (KR)

(72) Inventors: Seungjune Yi, Seoul (KR); Jeongkyun Yun, Seoul (KR); Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 53 days.

(21) Appl. No.: 16/343,479

(22) PCT Filed: Aug. 23, 2017

(86) PCT No.: PCT/KR2017/009191
§ 371 (c)(1),
(2) Date: Apr. 19, 2019

(87) PCT Pub. No.: WO2018/079998
PCT Pub. Date: May 3, 2018

(65) Prior Publication Data
US 2019/0268818 A1 Aug. 29, 2019

Related U.S. Application Data

(60) Provisional application No. 62/413,438, filed on Oct. 27, 2016.

(51) Int. Cl.
H04W 36/08 (2009.01)
H04W 76/27 (2018.01)
(Continued)

(52) U.S. Cl.
CPC ....... H04W 36/08 (2013.01); H04W 36/0033 (2013.01); H04W 36/02 (2013.01);
(Continued)

(58) Field of Classification Search
CPC .................................................... H04W 36/08
See application file for complete search history.

(56) References Cited

U.S. PATENT DOCUMENTS 8,331,290 B2 * 12/2012 Somasundaram .... H04L 1/1877
370/328
2010/0260097 A1 * 10/2010 Ulupinar ............... H04W 40/36
370/315
(Continued)

FOREIGN PATENT DOCUMENTS

KR 10-1446854 B1 10/2014
WO 2016/053027 A1 4/2016

OTHER PUBLICATIONS

Intel Corporation, "Handover without WT change procedure", R3-162239, 3GPP TSG RAN WG3 Meeting #93bis, Sophia Antipolis, France, Oct. 10-14, 2016, See section 2.1.
(Continued)

Primary Examiner — John D Blanton
(74) Attorney, Agent, or Firm — Dentons US LLP

(57) ABSTRACT

A method for performing handover in a wireless communication system and a device therefor are disclosed. Specifically, the method for performing handover by a user equipment (UE) without a wireless local area network (WLAN) termination (WT) change from a source eNodeB (eNB) to a target eNodeB (eNB) in a wireless communication system, the method includes transmitting an end-marker request for requesting retransmission of an end-marker packet to the target eNB when a loss of the end-marker packet is detected after the handover without the WT change is started, and retransmitting the end-marker request or performing a recovery procedure for the end-marker packet when the end-marker packet is not received from the target eNB after the transmitting the end-marker request.

7 Claims, 12 Drawing Sheets

(51) Int. Cl.
*H04W 36/00* (2009.01)
*H04W 36/02* (2009.01)
*H04W 74/08* (2009.01)
*H04W 80/08* (2009.01)
*H04W 84/12* (2009.01)

(52) U.S. Cl.
CPC ..... *H04W 36/023* (2013.01); *H04W 74/0833* (2013.01); *H04W 76/27* (2018.02); *H04W 80/08* (2013.01); *H04W 84/12* (2013.01)

(56) References Cited

U.S. PATENT DOCUMENTS

2015/0296418 A1* 10/2015 Szilagyi ................ H04L 69/161
370/331
2016/0142951 A1* 5/2016 Balasubramanian ........................
H04W 36/023
370/331
2016/0323062 A1* 11/2016 Yang ....................... H04L 47/34

OTHER PUBLICATIONS

Qualcomm Incorporated, "User Plane Details for Handover without WT change", R2-167114, 3GPP TSG-RAN2 Meeting #95bis, Kaohsiung, Taiwan, Oct. 10-14, 2016, See section 2.

* cited by examiner

[FIG. 1]
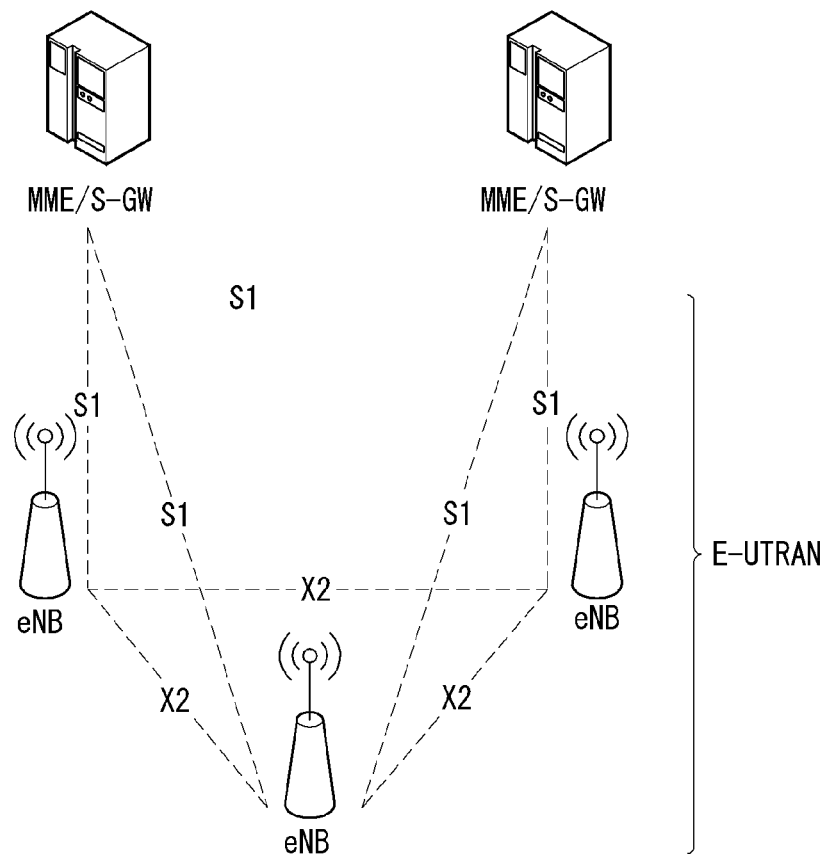

[FIG. 2]
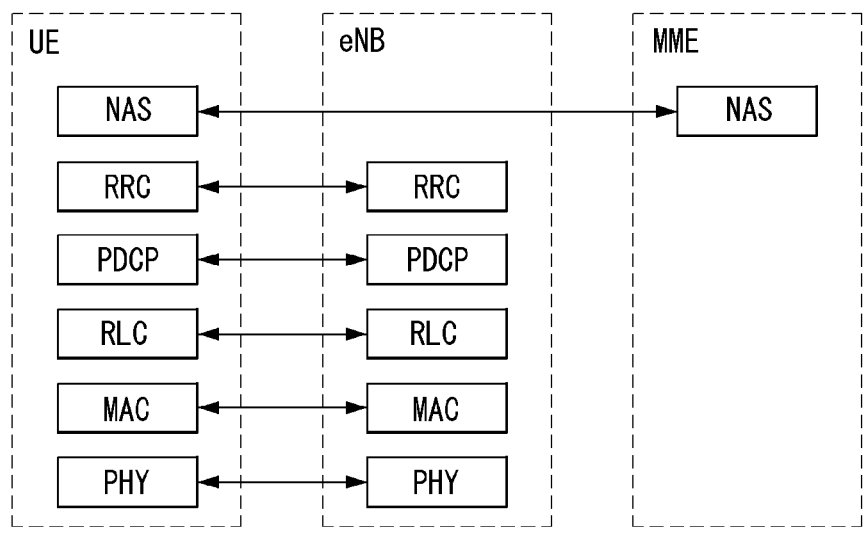
(a) Control plane protocol stack
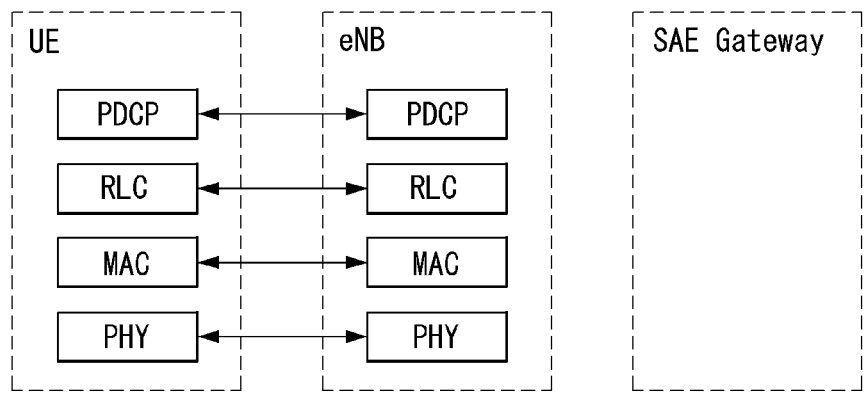
(b) User plane protocol stack

[FIG. 3]
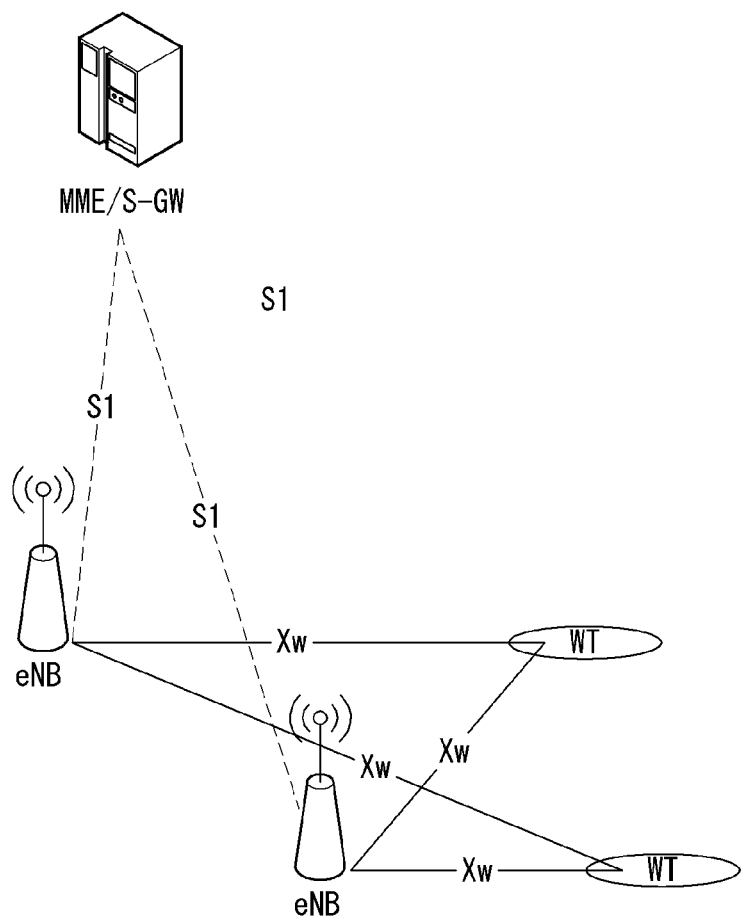

[FIG. 4]
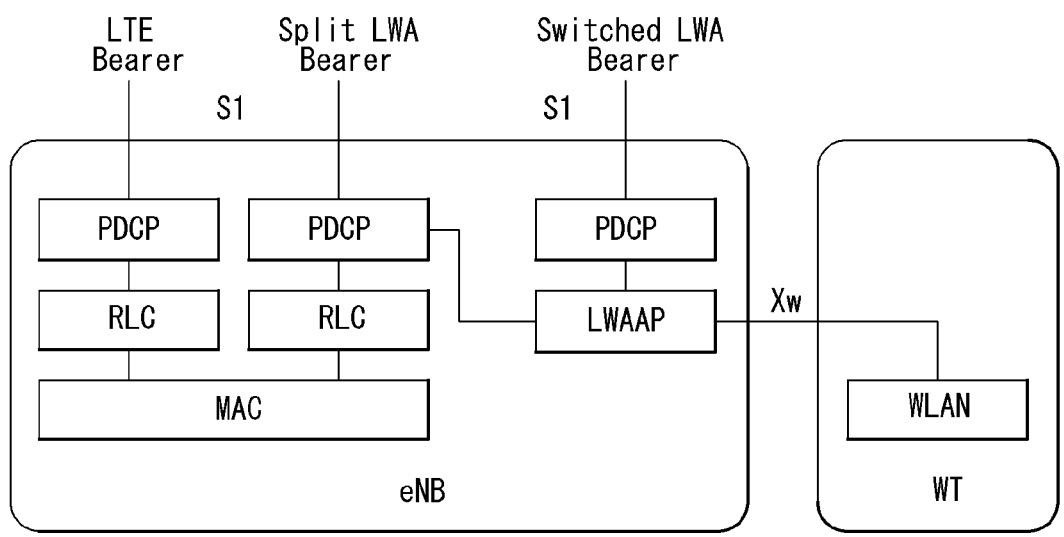

[FIG. 5]
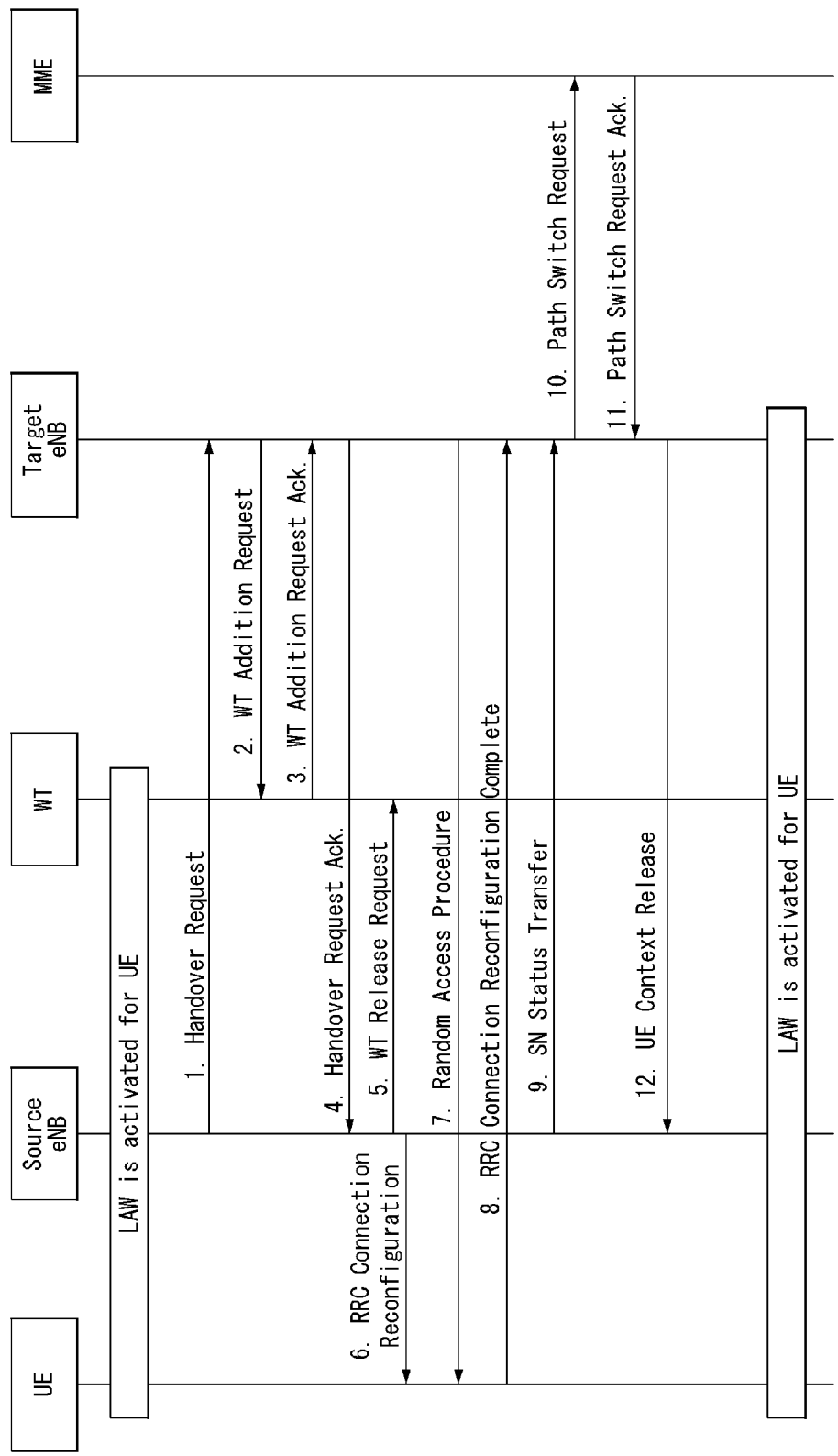

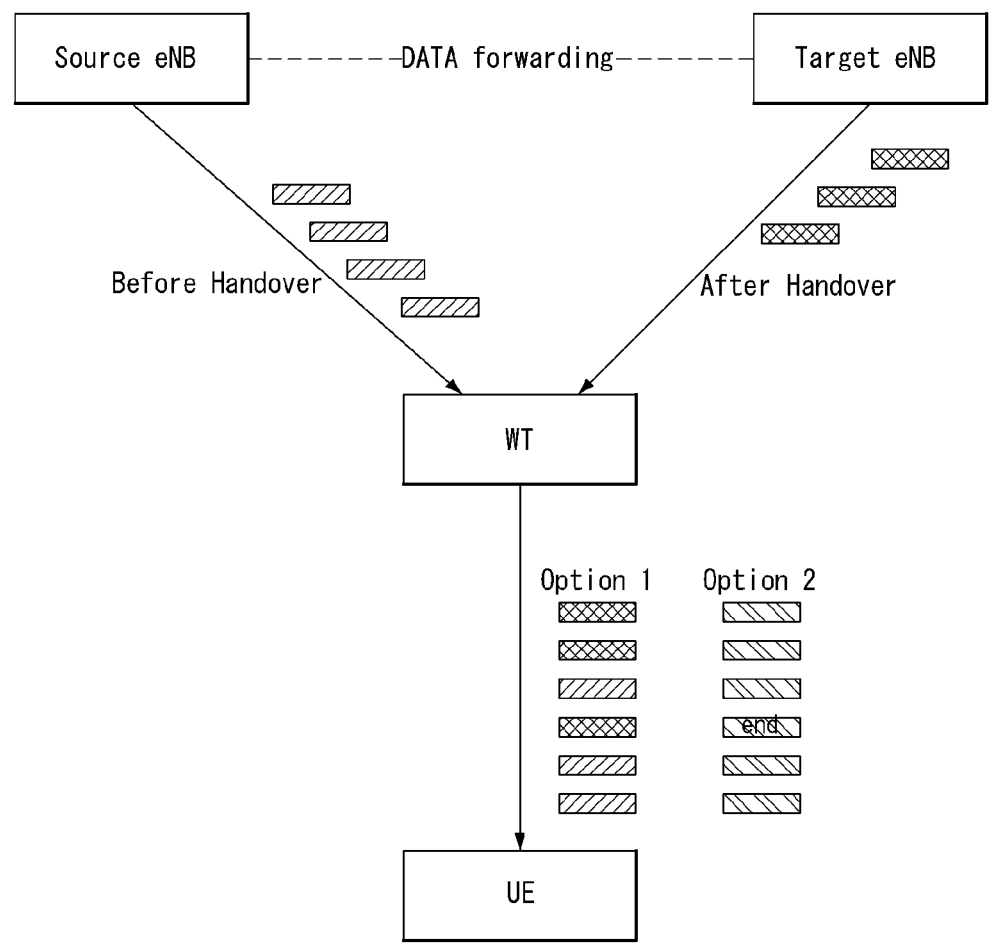
[FIG. 6]

[FIG. 7]
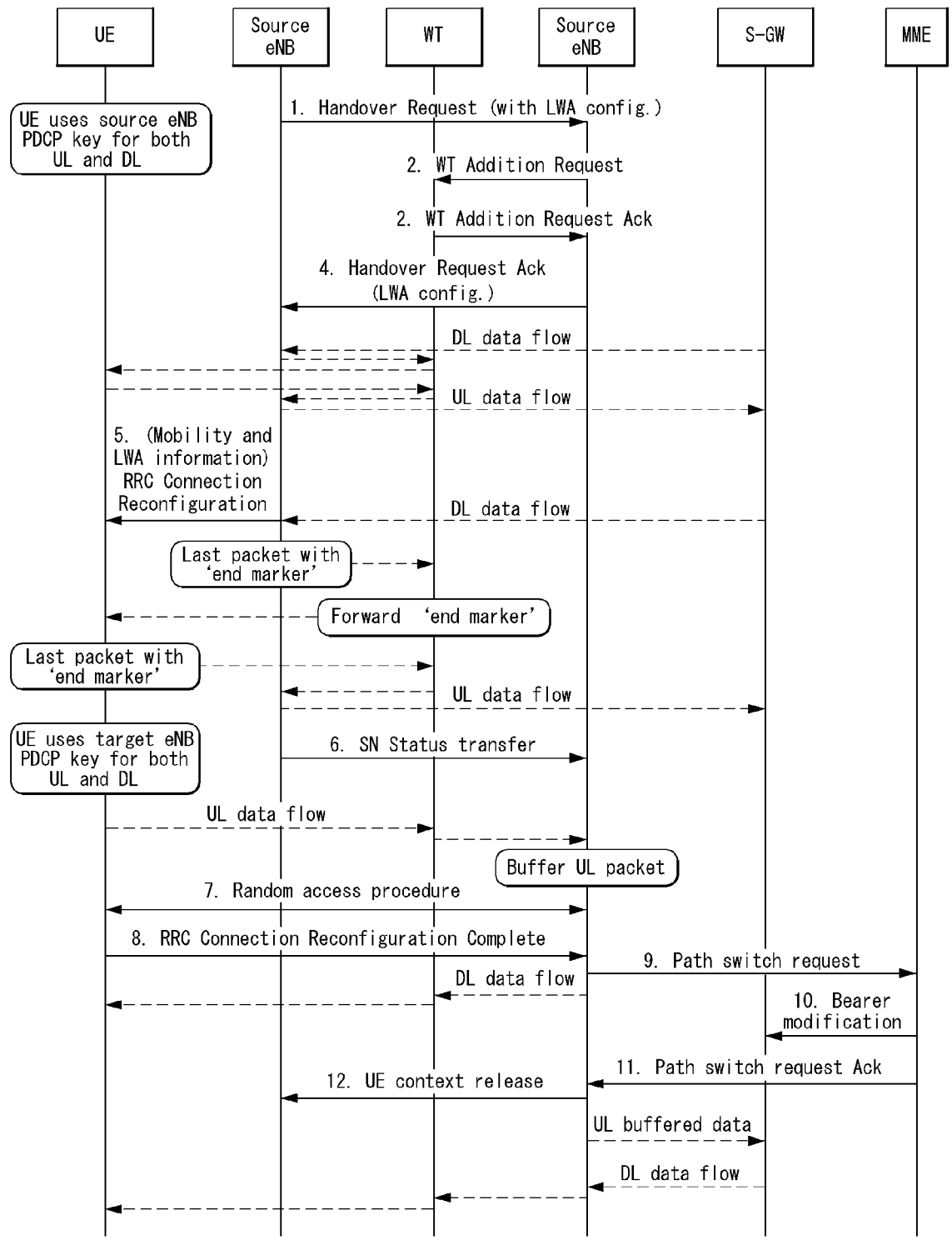

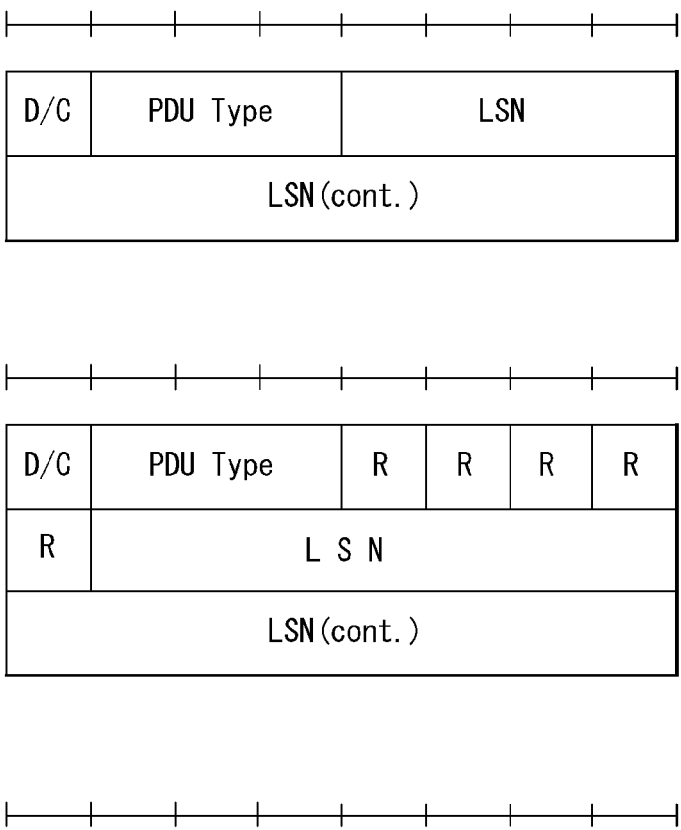
[FIG. 8]

[FIG. 9]
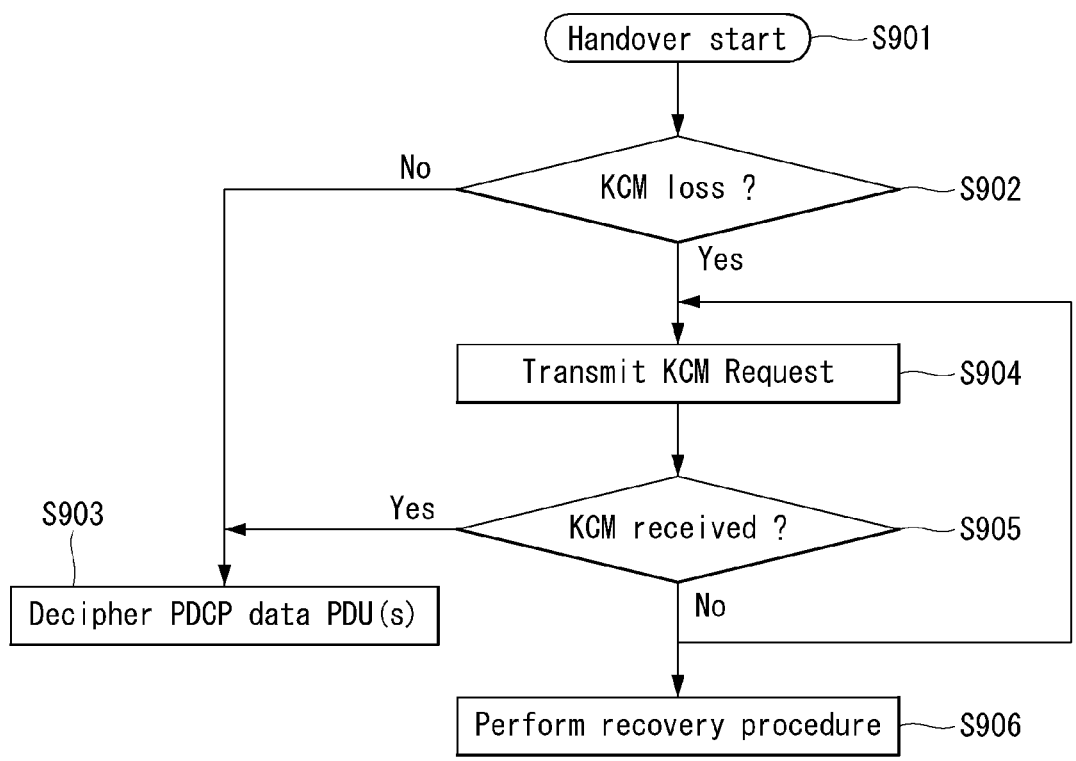

[FIG. 10]
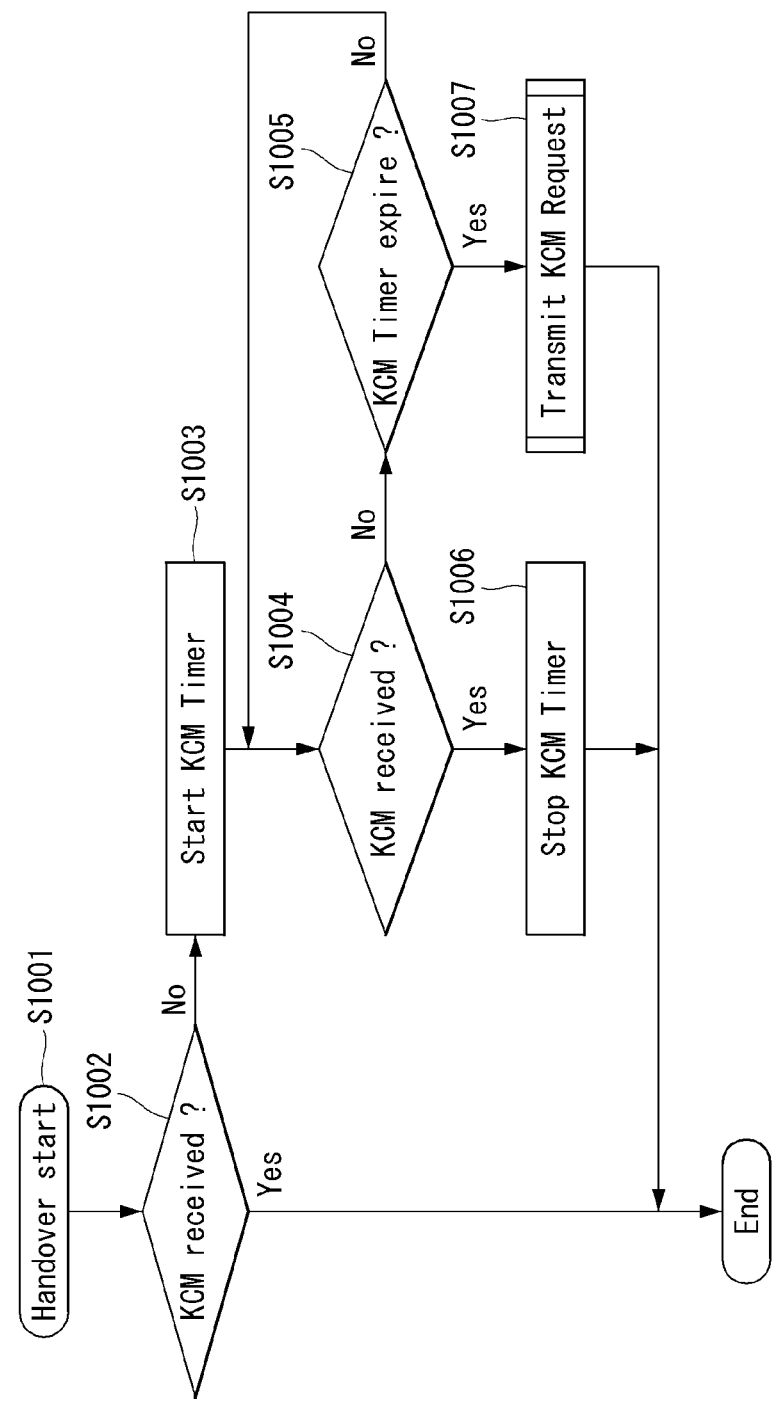

[FIG. 11]
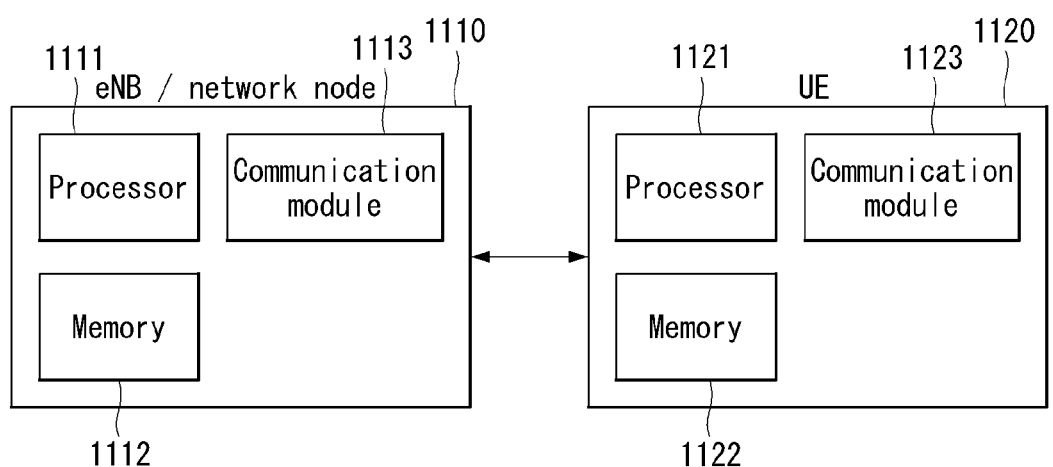

[FIG. 12]
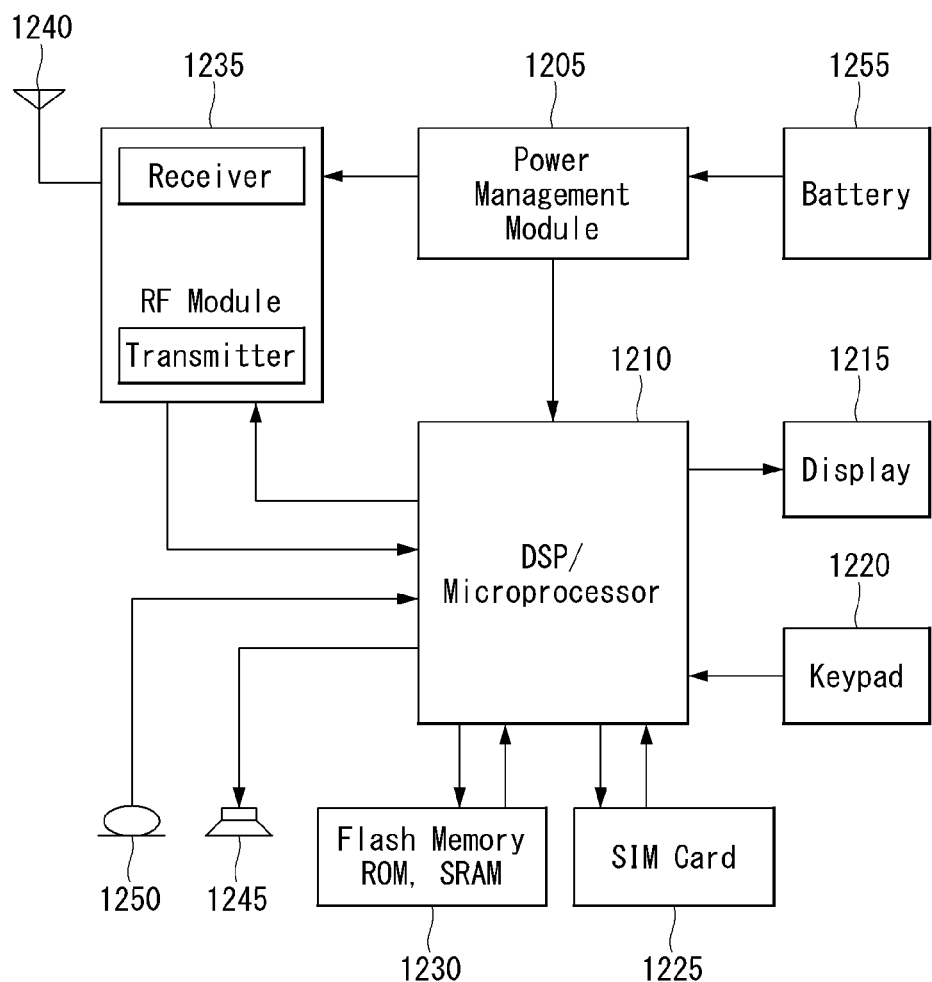

METHOD FOR PERFORMING HANDOVER IN WIRELESS COMMUNICATION SYSTEM AND DEVICE FOR SAME

This application is a National Stage Application of International Application No. PCT/KR2017/009191, filed on Aug. 23, 2017, which claims the benefit of U.S. Provisional Application No. 62/413,438, filed on Oct. 27, 2016, all of which are hereby incorporated by reference in their entirety for all purposes as if fully set forth herein.

TECHNICAL FIELD

The present invention relates to a wireless communication system, and more particularly, to a method for performing/supporting handover, particularly handover without a wireless local area network (WLAN) termination (WT) change and a device supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DETAILED DESCRIPTION OF INVENTION

Technical Problem

It is an object of the present invention to propose a method for performing/supporting handover (particularly, handover without a WT change) in a wireless communication system.

Furthermore, it is another object of the present invention to propose a method for controlling a loss of an end-marker packet in handover (particularly, handover without a WT change).

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present disclosure, a method for performing handover by a user equipment (UE) without a wireless local area network (WLAN) termination (WT) change from a source eNodeB (eNB) to a target eNodeB (eNB) in a wireless communication system, the method includes: transmitting an end-marker request for requesting retransmission of an end-marker packet to the target eNB when a loss of the end-marker packet is detected after the handover without the WT change is started; and retransmitting the end-marker request or performing a recovery procedure for the end-marker packet when the end-marker packet is not received from the target eNB after the transmitting the end-marker request.

Preferably, when the handover without the WT change is started, a packet data convergence protocol (PDCP) data protocol data unit (PDU) may be received from the source eNB or the target eNB.

Preferably, when the end-marker packet is received, a PDCP data PDU having a sequence number (SN) equal to or less than an SN of the end-marker packet may be deciphered using a first PDCP key of the source eNB, and a PDCP data PDU having an SN greater than the SN of the end-marker packet may be deciphered using a second PDCP key of the target eNB.

Preferably, the end-marker request may be transmitted by a packet data convergence protocol (PDCP) control protocol data unit (PDU), a PDCP data PDU, an LTE-WLAN aggregation adaptation protocol (LWAAP) header, or a radio resource control (RRC) message.

Preferably, the UE may determine that the handover without the WT change is started by receiving a handover command message from the source eNB, performing a random access procedure with the target eNB, or transmitting an RRC connection reconfiguration complete message to the target eNB.

Preferably, when the handover procedure without the WT change has been successfully started and the end-marker packet has not yet been received, and when an available space for storing the PDCP data PDU is less than a predefined threshold, it may be determined as the loss of the end-marker packet.

Preferably, when the handover procedure without the WT change has been successfully started and the end-marker packet has not yet been received, the loss of the end-marker packet may be detected based on a result of calculation using a sequence number (SN) of each PDCP data PDU.

Preferably, when the handover procedure without the WT change has been successfully started, a predefined timer may be driven, and when the end-marker packet has not been received until the timer expires, it may be determined as the loss of the end-marker packet.

Preferably, the recovery procedure may include: deciphering a PDCP data PDU having a sequence number greater than a largest sequence number of the PDCP data PDU received directly from the source eNB and having a continuous sequence number using a first PDCP key of the source eNB; deciphering a PDCP data PDU having a sequence number less than a smallest sequence number of the PDCP data PDU received directly from the target eNB and having a continuous sequence number using a second PDCP key of the target eNB; and discarding remaining PDCP data PDUs stored in the UE.

Preferably, the recovery procedure may include discarding a PDCP data PDU having a sequence number less than a smallest sequence number of the PDCP data PDU directly received from the target eNB.

In another aspect of the present disclosure, a method for performing handover by a target eNodeB (eNB) without a wireless local area network (WLAN) termination (WT) change from a source eNodeB (eNB) in a wireless communication system, the method includes: transmitting an end-marker request for requesting retransmission of an end-marker packet to a user equipment (UE) when a loss of the end-marker packet is detected after the handover without the WT change is started; and retransmitting the end-marker request or performing a recovery procedure for the end-marker packet when the end-marker packet is not received from the UE after the transmitting the end-marker request.

Preferably, when the handover without the WT change is started, a packet data convergence protocol (PDCP) data protocol data unit (PDU) may be received from the UE.

Preferably, when the end-marker packet is received, a PDCP data PDU having a sequence number (SN) equal to or less than an SN of the end-marker packet may be deciphered using a first PDCP key of the source eNB, and a PDCP data PDU having an SN greater than the SN of the end-marker packet may be deciphered using a second PDCP key of the target eNB.

Preferably, the end-marker request may be transmitted by a packet data convergence protocol (PDCP) control protocol data unit (PDU), a PDCP data PDU, an LTE-WLAN aggregation adaptation protocol (LWAAP) header, or a radio resource control (RRC) message.

Preferably, the target eNB may determine that the handover without the WT change is started by receiving a handover request message from the source eNB, transmitting a handover request acknowledgment message to the source eNB, receiving an RRC connection reconfiguration complete message from the UE by an established wireless interface with the UE, receiving an SN status transfer message from the source eNB, or receiving the end-marker packet from the source eNB.

Preferably, when the handover procedure without the WT change has been successfully started and the end-marker packet has not yet been received, and when an available space for storing the PDCP data PDU is less than a predefined threshold, it may be determined as the loss of the end-marker packet.

Preferably, when the handover procedure without the WT change has been successfully started and the end-marker packet has not yet been received, the loss of the end-marker packet may be detected based on a result of calculation using a sequence number (SN) of each PDCP data PDU.

Preferably, when the handover procedure without the WT change has been successfully started, a predefined timer may be driven, and when the end-marker packet has not been received until the timer expires, it may be determined as the loss of the end-marker packet.

Preferably, the recovery procedure may include: deciphering a PDCP data PDU having a sequence number less than a smallest sequence number of the PDCP data PDU received directly from the UE and having a continuous sequence number using a second PDCP key of the target eNB; and discarding remaining PDCP data PDUs stored in the target eNB.

Preferably, the recovery procedure may include discarding a PDCP data PDU having a sequence number less than a smallest sequence number of the PDCP data PDU directly received from the UE.

Advantageous Effects

According to an embodiment of the present invention, it is possible to control an error case that may occur upon a loss of an end-marker packet during a handover (particularly, handover without a WT change) procedure.

According to an embodiment of the present invention, it is possible to prevent problems that a key used for deciphering a data packet received by a UE or a target eNB during a handover procedure is confused.

It will be appreciated by persons skilled in the art that the effects that can be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 1 illustrates one example of a network structure of an Evolved Universal Terrestrial Radio Access Network (E-UTRAN) to which the present invention can be applied.

FIG. 2 illustrates a radio interface protocol structure between a UE and an E-UTRAN in a wireless communication system to which the present invention can be applied.

FIG. 3 illustrates a schematic architecture for a non-collocated LWA scenario in a wireless communication system to which the present invention can be applied.

FIG. 4 illustrates LWA radio protocol architecture for a non-collocated LWA scenario in a wireless communication system to which the present invention can be applied.

FIG. 5 illustrates an inter-eNB handover procedure without a WT change in a wireless communication system to which the present invention can be applied.

FIG. 6 is a diagram illustrating a PDCP key problem in handover without a WT change in a wireless communication system to which the present invention can be applied.

FIG. 7 illustrates a handover procedure without a WT change using an end marker in a wireless communication system to which the present invention can be applied.

FIG. 8 illustrates a PDCP control PDU format for an LWA end-marker packet in a wireless communication system to which the present invention can be applied.

FIG. 9 is a diagram illustrating a handover procedure according to an embodiment of the present invention.

FIG. 10 is a diagram illustrating a method of detecting a loss of an end marker packet (KCM) according to an embodiment of the present invention.

FIG. 11 illustrates a block diagram of a communication device according to an embodiment of the present invention.

FIG. 12 illustrates a block diagram of a communication device according to an embodiment of the present invention.

MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Overview of System to Which the Present Invention may be Applied

FIG. 1 illustrates one example of an Evolved Universal Terrestrial Radio Access Network (E-UTRAN) to which the present invention can be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 1, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Protocol Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 2 illustrates a radio interface protocol structure between a UE and an E-UTRAN in a wireless communication system to which the present invention can be applied.

FIG. 2(a) illustrates a radio protocol structure for the control plane, and FIG. 2(b) illustrates a radio protocol structure for the user plane.

With reference to FIG. 2, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

LTE-Wireless Local Area Network (WLAN) Aggregation (LWA)

The E-UTRAN supports LWA operation, and the UE, which is in RRC connection (RRC_CONNECTED) status, may be configured to use the radio resources of LTE and WLAN to the eNB.

The following two scenarios are supported depending on backhaul connections between LTE and WLAN:

A non-collocated LWA scenario for non-ideal backhaul;
A collocated LWA scenario for ideal/internal backhaul;

FIG. 3 illustrates a schematic architecture for a non-collocated LWA scenario in a wireless communication system to which the present invention can be applied.

Referring to FIG. 3, a WLAN termination (WT) terminates an Xw interface for WLAN.

Here, the WT means a logical node terminating the Xw interface on the WLAN side.

In a non-collocated LWA scenario, an eNB is connected to one or more WT(s) through the Xw interface. In a collocated LWA scenario, an interface between LTE and WLAN depends on implementation. In the LWA, a required interface to a core network is only S1-U and S1-MME terminated in the eNB. A core network interface is not required for the WLAN.

1) User Plane

In the non-collocated LWA scenario, an Xw user plane (Xw-U) interface is defined between the eNB and the WT. The Xw-U interface supports flow control based on feedback from the WT.

When E-RAB is mapped to an LWA bearer, the flow control function is applied to downlink. That is, flow control information is provided to the eNB by the WT so that the eNB can control a downlink user data flow to the WT for the LWA bearer. Operations, administration and maintenance configure information on whether an Xw DL delivery status provided from the connected WT is related to LWA adaptation protocol (LWAAP) protocol data unit(s) (PDU)(s) that is successfully delivered to a UE or delivered for the UE to the eNB.

The LWAAP PDU is a PDU having a data radio bearer (DRB) identy (ID) generated by an LWAAP entity for transmission through the WLAN in the LWA.

The Xw-U interface is used to deliver the LWAAP PDU (s) between the eNB and the WT.

In the LWA, the S1-U is terminated in the eNB. When an Xw-U user data bearer is associated with E-RAB(s) to which an LWA bearer option is configured, user plane data is delivered from the eNB to the WT using the Xw-U interface.

2) Control Plane

In the non-collocated LWA scenario, an Xw control plane (Xw-C) interface is defined between the eNB and the WT.

An application layer signaling protocol is referred to as an Xw application protocol (Xw-AP).

The Xw-AP supports the following functions:

Delivery of WLAN metric from the WT to the eNB;

LWA support for UEs in ECM connection (ECM-CONNECTED) status: Establishment of a UE context in the WT, Modification and Release; Control of a user plane tunnel between the eNB and the WT for a specific UE for the LWA bearer.

General Xw management and error control function: Error indication; Xw setup; Wx reset; Update of WT configuration data.

eNB-WT control plane signaling for the LWA is performed using Xw-C interface signaling.

There is one S1-MME connection for each LWA UE between the eNB and the MME. Each coordination between the eNB and the WT is performed using Xw interface signaling.

In the LWA, radio protocol architecture used by a specific bearer depends on how LWA backhaul scenario and bearer are set up. There are two bearer types for the LWA: One is a split LWA bearer and the other is a switched LWA bearer.

FIG. 4 illustrates LWA radio protocol architecture for a non-collocated LWA scenario in a wireless communication system to which the present invention can be applied.

An LTE bearer means a bearer in which a radio protocol of the bearer is located in an eNB in order to use only eNB radio resources in an LWA.

An LWA bearer means a bearer in which the radio protocol of the bearer is located in both the eNB and a WLAN in order to use both the eNB and WLAN resources in the LWA.

A split LWA bearer means a bearer in which the radio protocol of the bearer is located in both the eNB and the WLAN in order to use both the eNB and WLAN radio resources in the LWA.

A switched LWA bearer means a bearer using only the WLAN radio resources, where the radio protocol of the bearer is located in both the eNB and WLAN in the LWA.

Referring to FIG. 4, in downlink, for transmission of a PDU through the WLAN for LWA operation, an LWAAP entity generates an LWAAP PDU including a DRB identity, a WT uses an LWA ethernet type (EtherType) to deliver data to a UE through the WLAN. The UE uses the LWA ethernet type to determine if a received PDU belongs to the LWA bearer and uses the DRB identity to determine the LWA bearer to which the PDU belongs.

In uplink, for transmission of the PDU through the WLAN for the LWA operation, the LWAAP entity in the UE generates the LWAAP PDU including the DRB identity, the UE uses the LWA ethernet type to transmit data through the WLAN.

The LWA supports split bearer operation, and a PDCP sublayer supports in-sequence delivery of upper layer PDU (s) based on a reordering procedure introduced for dual connectivity (DC).

If feedback from the WT is not available, the UE supporting the LWA may be configured by the eNB to transmit a PDCP status report or a LWA status report.

In the LWA bearer, if transmittable data is equal to or exceeds a threshold configured by an E-UTRAN, the UE determines which PDCP PDU(s) to transmit through the WLAN or LTE. If available data is below the threshold, the UE transmits the PDCP PDU(s) through the WLAN or LTE according to the configuration by the E-UTRAN.

In each LWA DRB, the E-UTRAN may configure an IEEE 802.11 AC value to be used for the PDCP PDU(s) transmitted through the WLAN in the uplink.

In the LWA bearer, for routing of uplink data through the WLAN, a WT MAC address may be provided to the UE by the E-UTRAN or using another WLAN procedure.

A User Plane for Handover Without a Wireless Local Area Network (WLAN) Termination (WT) Change Inter-eNB handover without a WT change is under discussion. In particular, it has been agreed that in 3GPP RAN3, RRC parameter 'LWA-Config-r13' (including parameters used for WLAN mobility and parameters used by the UE for WLAN authentication) and WLAN measurement are included in 'AS-Config' (including information about RRC configuration information in a source eNB so that it can be used to determine whether change of RRC configuration is necessary during a handover preparation step by a target eNB) that is an RRC information element (IE) in a handover request message. It has also been agreed that handover and S-KWT updates are accomplished in two independent procedures.

When LTE-WLAN aggregation (LWA) is configured, the inter-eNB handover can be performed by first releasing the WT at the source eNB and then adding the WT at the target eNB. This procedure requires re-establishing of link with the WLAN even if there is no change in an AP. The following method has been proposed to minimize or eliminate this interruption.

A 3GPP RAN2 has agreed not to require re-establishment with the WLAN during the inter-eNB handover to resolve control plane (CP) interruption. Since there are more dependencies between the LTE and the WLAN due to an eNB PDCP which is an anchor point of aggregation as well as a PDCP re-establishment procedure at the UE during the handover (HO), control of the user plane (UP) is more complicated.

A current call flow adopted by the 3GPP RAN3 for the inter-eNB handover without the WT change is shown in FIG. 5 below.

FIG. 5 illustrates an inter-eNB handover procedure without a WT change in a wireless communication system to which the present invention can be applied.

In FIG. 5, it is assumed that an LWA is activated for a UE between the UE, a source eNB, and a WT.

1. The source eNB starts a handover procedure by initiating an X2 handover preparation procedure. The source eNB includes an LWA configuration in the handover request (Handover Request) message.

The LWA configuration may include a mobility set that is currently valid for the UE, a WT UE Xw application protocol (XwAP) identifier (ID)/UE WLAN media access control (MAC) address as a reference to a UE context in the WT that was established by the source eNB, and a WT ID.

2. If the target eNB determines to maintain an LWA connection, the target eNB transmits a WT addition request (WT Addition Request) message to the WT.

The WT addition request message may include the WT UE XwAP ID/UE WLAN MAC address as a reference to the UE context in the WT that was established by the source eNB. The WT uses this information to check if the UE context exists.

3. If successful, the WT responds with a WT addition request acknowledge (WT Addition Request Ack) message.

4. If both the target eNB and the WT are determined to maintain the LWA in steps 2 and 3, the target eNB transmits a handover request acknowledge (Handover Request Ack) message.

The handover request acknowledge message may include the LWA configuration and a UE LWA context kept indicator, and may provide a delivery address to the source eNB.

5. The source eNB transmits a WT release request (WT Release Request) message indicating whether the UE context is matched in the target eNB to the WT.

The WT maintains a relevant portion of the UE context based on identification information provided from the target eNB in step 2.

6. The source eNB triggers the UE to apply new configuration. That is, the source eNB transmits an RRC connection reconfiguration (RRC Connection Reconfiguration) message to the UE.

7-8. The UE synchronizes with the target eNB (i.e., performs a random access procedure (Random Access Procedure)), and responds with an RRC connection reconfiguration complete (RRC Connection Reconfiguration Complete) message.

9. The source eNB transfers a status of flow control by transmitting a sequence number (SN) status transfer (SN Status Transfer) message to the target eNB.

10-11. The target eNB initiates an S1 path switch (S1 Path Switch) procedure. That is, the target eNB transmits a path switch request (Path Switch Request) message to the MME and receives a path switch request acknowledge (Path Switch Request Ack) message in response to the path switch request message.

12. The target eNB initiates a UE context release (UE Context Release) procedure towards the source eNB. That is, the target eNB transmits a UE context release (UE Context Release) message to the source eNB.

After completing this step, it is assumed that the LWA is activated for the UE between the UE, the target eNB, and the WT.

In FIG. 5, a portion that may affect user plane optimization includes an Xw switch from the source eNB to the target eNB, a timing of Xw release from the source eNB, and data transfer during HO.

An agreed call flow reflects inter-MeNB handover between dual connectivity (DC) master eNB (MeNB) without secondary eNB (SeNB) change. Here, the target eNB adds the WT after receiving the handover request, and the source eNB releases the WT after receiving the handover request acknowledgment. Both the dual connectivity and enhanced LWA (eLWA) have not defined how the WT handles an interface with the source eNB until the WT is released from the source eNB from the time it receives a WT addition from the target eNB.

It can be assumed that Xw between the source eNB and the WT is maintained until the release is received. That is, it is desirable to assume that the WT maintains the activation of the source eNB and Xw until the WT Release procedure is received (i.e., both Xw-C and Xw-U are utilized).

During the LTE HO procedure, when the UE receives an HO command, the UE reconfigures the MAC, resets it, and re-establishes a PDCP. At this time, the UE stops communication with the source eNB and also changes a security key to a security key received from the target eNB. However, after this point in time, the UE needs to continue to use a source eNB key to continue to receive packets through a WLAN.

That is, during the inter-eNB HO, in order to receive data through the WLAN after receiving the HO command, the UE must use the source eNB key to decipher the received data.

The key to the above operation is to signal an indication to the UE when the eNB stops transmitting data to the WLAN. By doing so, the UE can know when to stop using the source eNB key. This indication may be performed within the control plane (CP) or the user plane (UP).

In case of the CP indication, the eNB may include a last PDCP sequence number (SN) transmitted to the WLAN in the HO command. However, since the source eNB must transparently transmit a DCCH message received from the target eNB, this information must be provided to the target eNB in the handover request. Additional complexity may be required.

Hereinafter, a UP option will be described.

In order to indicate a change in the key, a reserved bit in an LTE-WLAN aggregation adaptation protocol (LWAAP) header may be used. This can lead to the following issues:

A ciphering key is always signaled to the UE in the RRC message. It is not an existing method to transmit an index of a key in the UP.

It is necessary to be configured by the RRC how the index in the LWAAP header is mapped to a PDCP key.

Mapping and necessary bits need to be designed to control an HO ping-pong. Therefore, one more bit is needed.

There are only three reserved bits in the LWAAP header. It may not be possible to use two or all of these bits.

A greater problem with using the LWAAP header is to control uplink data through the WLAN. The WT can check the LWAAP header to determine what eNB data is delivered. This leads to the following additional issues:

LWAAP is transparent to the WLAN in Release-13 because the LWAAP resides in the UE and eNB and information included in the LWAAP header is not related to WLAN operation. This proposal changes the Release-13 architecture.

The WT is significantly affected because it must perform deep packet inspection. In the Release-13, this function was developed to allow minimum requirements in the WT.

In the LWA, interactions and interfaces between the WT and the WLAN are not specified because they are outside a 3GPP range.

In LTE handover, the uplink data is always transmitted from a single eNB to an S-GW. Through this proposal, the two eNBs can eventually transmit data, which may require modification of the S-GW implementation.

Therefore, signaling a PDCP key change may not be performed using the reserved bit in the LWAAP header.

A simpler alternative is to employ an "end-marker" packet scheme that is used for switching of an S1-U link during X2 handover. In fact, Xw-U switching is much simpler than S1-U switching. In the X2 handover, when the S-GW decides to stop transmitting data to the source eNB through S1-U (triggered by a path switch request), the S-GW may transmit one or more "end-marker" packets. In the eLWA case, this may be performed on a downlink and an uplink.

During an inter-eNB HO procedure without the WT change, the source eNB may transmit an "end-marker" packet to signal termination of transmission through the WLAN.

Also, during the inter-eNB HO procedure without the WT change, the UE may transmit an "end-marker" packet to signal termination of transmission of a source eNB ciphering key.

An "end-marker" packet used for the S1-U switching may be a specific GPRS Tunneling Protocol (GTP)-U message. In the eLWA, a new PDCP data PDU type should prevent the UE from reordering these packets. Two types of control PDUs may be considered: 1) Reuse of existing PDCP or LWA status reports, 2) Definition of new control "PDU type"

Option 1 does not affect Abstract Syntax Notation One (ASN.1) because it depends on existing reports. LWA or PDCP status report can provide additional information about receiver status and can help in packet recovery and duplicate transmission elimination. On the uplink, even if triggered by periodic reporting or polling, an initial report by the UE may be regarded as an "end-marker".

Option 2 is simpler. A PDCP PDU type is indicated by 3 bits, and only three of them are used. Another benefit of this option is that it can be used for LTE-LTE DC as well as LTE-NR (New RAT) DC for the purpose of maintaining secondary link activation during primary link handover.

3GPP RAN2 has agreed to use the existing PDCP and the LWA status reports or to introduce new control PDU types to be used as "end-marker".

Using the method described above, the source eNB can continue to transmit data to the WT through an existing tunnel, the UE may continue to receive this data using an existing PDCP (and WLAN) key while performing a reconfiguration in LTE. The source eNB can transmit an end-marker packet at any time and can deliver remaining data to the target eNB. This is to keep the WLAN transmission continuing until the WT is released.

On the uplink, the eNB may transmit a WT release after receiving an end marker from the UE (similar to the S-GW in the S1-U). The source eNB can still receive packets from the WT after the end marker, but they can be delivered to the target eNB.

An Xw uplink may be switched when receiving the WT Addition from the target eNB. In this case, all uplink PDUs may be transmitted to the target eNB. To this end, the target eNB needs to use the source eNB for PDUs that arrived before the end market. This requests a source eNB K_eNB to be delivered while transmitting an HO request to the target eNB. This is only used to decipher a previous packet for a short time, and since the SeNB K_eNB is already signaled on X2 in the DC, it should be allowed from a security point of view.

When 3GPP RAN3 decides to switch the Xw to the target eNB during the WT Addition, the source eNB can signal its K_eNB that can be used by the target eNB to decipher the PDU ciphered with the source eNB key.

PDCP Key and WT Release Issue

Various aspects related to mobility optimization, for example, intra and inter eNB handover without the WT change, are discussed.

An issue of PDCP key update and an issue of when the source eNB performs the WT release have not been solved yet during handover without the WT change.

In Release-14 eLWA work item, (if the target eNB accepts the LWA configuration that is at least partially overlapped with a WLAN mobility set) it has agreed to adopt a handover procedure without the WT change for continuous data reception/transmission. However, problems related to the PDCP key update may occur during the handover. This will be described with reference to the following drawings.

FIG. 6 is a diagram illustrating a PDCP key problem in handover without a WT change in a wireless communication system to which the present invention can be applied.

In legacy handover, when a UE receives an HO command from a source eNB, data transmission from the source eNB is interrupted. The UE immediately updates a key and starts using a target eNB K_eNB.

As illustrated in FIG. 6, in case of handover without a WT change, a PDCP packet transmitted from the source eNB is ciphered using a source eNB K_eNB until the source eNB transmits the HO command to the UE. However, when the UE receives the HO command, there may be a PDCP PDU ciphered with the source eNB K_eNB pending in a WT, and the UE does not know a PDCP key that should be used to decipher these PDUs.

Two options may be considered for notifying the UE which K_eNB is ciphered:

Option 1. The eNB (source or target) may mark all packets to indicate whether they are ciphered by the source eNB or target eNB.

Option 2. The source eNB may mark only an end packet transmitted from the source eNB.

In Option 2 above, the source eNB can mark indicating that the data is no longer being forwarded to the WT to a last packet. Before the WT receives an end marker from the source eNB, a target eNB packet may be buffered in the WT. When the end marker is received, the WT can forward the target eNB packet to the UE. To implement the end marker there are three options as follows:

Option A: Use 1 bit in an LWAAP header
Option B: Generate a new PDCP PDU type
Option C: Use 1 bit in a PDCP header The Option A above uses reserved bits in the LWAAP header to mark the end packet from the source eNB. An advantage is that the WT has already read the LWAAP header and no further effort is required on the WT. The Options B and C place the end marker at a PDCP level. The Option B generates a special PDCP PDU type using one of serving PDCP types to indicate the end marker. An advantage is that 1 bit is not wasted in every packet. However, the WT needs to check the PDCP PDU during the handover. The Option C has the same disadvantages as the Option A and the Option B. Therefore, it may not be suitable as the end marker.

FIG. 7 illustrates a handover procedure without a WT change using an end marker in a wireless communication system to which the present invention can be applied.

FIG. 7 shows a signaling flow for handover without a WT change using an end marker (Option 2) to indicate a last source eNB packet, and a UE may switch to a target eNB PDCP key at a time that is corrected in both UL and DL.

The handover procedure is summarized as follows:

Step 1. A source eNB transmits a handover request (HO Request) including an LWA configuration (LWA config) to the target eNB.

Step 2. The target eNB transmits a WT addition request (WT Addition Request) to a WT.

Step 3. The WT responds to the target eNB with a WT addition request acknowledgment (WT Addition Request Ack).

Step 4. The target eNB transmits a handover request acknowledgment (Handover Request Ack) including the LWA configuration to the source eNB.

Step 5. The source eNB transmits an RRC connection reconfiguration (RRC Connection Reconfiguration) including an HO command (prepared by the target eNB) to the UE.

The source eNB transmits a last packet including the end marker to the WT, and then stops transmitting a packet to the WT. If there is no data to be transmitted from the source eNB, the source eNB may transmit an end-marker packet without a payload.

The WT forwards all packets from the source eNB to the UE until it receives the "end marker", and then begins to forward packets from the target eNB. After the "end marker", the packet received from the source eNB is flushed by the WT.

The UE continues to use a source eNB PDCP key until it receives the "end marker", and after receiving the "end marker", the UE starts using the target eNB PDCP key.

In the UL, there are two options for transmitting an end marker indicating when the UE will later use a target PDCP key to the WT:

Option 1: The UE uses the target eNB PDCP key immediately after receiving the HO command In this option, the WT can immediately forward UL data to the target eNB after the WT is added. This may reduce a time the source eNB can still receive data from the WT after the HO command is transmitted.

A disadvantage of this option is that the UE must track the source eNB and target eNB PDCP keys for the UL and DL.

Option 2: The UE uses the target eNB PDCP key after receiving the end marker.

In this option, the UE uses a source eNB key for both the UL and DL until it receives the end marker from the source eNB. The UE then uses the target eNB PDCP key. The UE can know where the WT should transmit the packet by transmitting an end marker indicating when the PDCP key is switched to the WT.

An advantage of this option is that the UE keeps only one set of keys at any given timer. A key update occurs when the end marker is received for both the UL and DL.

Step 6. The source eNB transmits an SN status transfer to the target eNB.

Step 7. The UE performs a RACH procedure to complete the handover with the target eNB.

Thus, the end marker may be used to indicate the last packet ciphered by the source eNB key.

Meanwhile, since the source eNB transmits a WT release message to the WT before the RRC connection reconfiguration, and the WT stops forwarding data after receiving the WT release message, as a result, service interruption can occur. Since the purpose of the HO without the WT change is to reduce service interruption during the HO, additional options need to be considered. In general, the options for the source eNB to instruct the WT to release the WT are:

Option 1: Before RRC Connection Reconfiguration (between step 4 and step 5 in FIG. 7)

Option 2: After SN Status transfer (between step 5 and step 6 in FIG. 7)

In Option 1, since the WT is released before the source eNB transmits the RRC Connection Reconfiguration to the UE, the source eNB can no longer forward data to the UE using the WT. The UE can receive data from the WT only after successful handover to the target eNB. This is in contrast to the purpose of work item intention to introduce the handover without the WT change. In the current procedure, a WT Release instruction is used by the WT to determine when to transmit the UL data to the target eNB, not the source eNB. The end marker solution described above can solve this problem and delay the WT release, and thus, it can implement a make before break HO procedure to reduce potential service interruptions.

Accordingly, the source eNB may not release the WT before the RRC connection reconfiguration for the handover without the WT change.

In Option 2, when the WT is released after transmitting the SN status, the source eNB forwards the data to the target eNB. Therefore, continuous data communication using the WT is not a problem during the handover. In this case, the source eNB has completed transmitting any buffer DL data to the UE, and also provides the UE with an opportunity to transmit any buffered UL data in a WLAN branch ciphered with a source K_eNB. Thus, the WT release after the SN status transfer may be desirable.

Therefore, the source eNB can release the WT after the SN status transfer for the handover without the WT change.

End Marker

An End Marker message should be transmitted after transmitting a last G-PDU to be transmitted through a GTP-U (GTP User plane) tunnel as specified in 3GPP TS 23.401 (for example, version 14.1.0) or after receiving an End Marker Indication as specified in 5.7 of 3GPP TS 23.402 (for example, version 14.4.0). The End Marker message should be transmitted for each GTP-U tunnel except a case of an E-UTRAN initiated E-RAB modification procedure. During the E-UTRAN initiated E-RAB modification procedure, (i.e., if an S1 eNodeB fully qualified tunnel endpoint identifier (F-TEID) of the GTP-U tunnel that is provided by the MME in a Modify Bearer Request or a Modify Access Bearer Request is not the same as that previously stored in a SGW) the SGW should transmit the end marker message to the eNB of a previous S1-U tunnel for switched tunnel(s). Each GTP-U tunnel is identified by a TEID value of a GTP-U header. The End Marker message indicates an end of a payload stream in a given tunnel. That is, a GTP-U Packet Data Unit (G-PDU) arriving after the End Marker message on the tunnel can be discarded.

The End Marker message may include a Private Extension IE. Here, the Private Extension IE may include vendor or operator specific information.

When an End Marker message including a TEID with no context is received, a receiver ignores the message.

The MME may receive the End Marker packet through an S11-U tunnel during the following procedure:

Inter-MME Tracking Area Update Procedure (TAU) procedure

Establishment of an S1-U bearer during Data Transport in control plane Cellular Internet of Things (CIoT) EPS optimization The MME discards the End Marker packet. The MME may also initiate release of a corresponding S11-U resource.

PDCP Control PDU

The PDCP control PDU is used to carry the following:

PDCP status report indicating that a PDCP Service Data Unit(s) (SDU(s)) is lost and is not followed by PDCP re-establishment Header compression control information LWA status report LWA end-marker packet Hereinafter, a PDCP control PDU format for the LWA end-marker packet will be described.

FIG. 8 illustrates a PDCP control PDU format for an LWA end-marker packet in a wireless communication system to which the present invention can be applied.

FIG. 8 (a) illustrates a PDCP control PDU format for an LWA end-marker packet when a sequence number (SN) length of 12 bits is used, FIG. 8 (b) illustrates a PDCP control PDU format for an LWA end-marker packet when a sequence number (SN) length of 15 bits is used, and FIG. 8 (c) illustrates a PDCP control PDU format for an LWA end-marker packet when a sequence number (SN) length of 18 bits is used.

Referring to FIG. 8, 'D/C' is composed of a length of 1 bit and indicates whether the corresponding PDU is a control PDU or a data PDU.

'PDU type' is composed of a length of 3 bits. If a value is '000', it indicates that a packet is a PDU control packet for PDCP status report, if the value is '001', it indicates that the packet is a PDU control packet for an interspersed robust header compression (ROHC) feedback packet, if the value is '010', it indicates that the packet is a PDU control packet for LWA status report, and if the value is '011', it indicates that the packet is a PDU control packet for the LWA end-marker packet.

'R' is composed of a length of 1 bit and corresponds to a reserved bit.

'LSN' is composed of 12 bits when an SN length of 12 bits is used, 15 bits when an SN length of 15 bits is used, and 18 bits when an SN length of 18 bits is used.

'LSN' indicates a PDCP SN of a last PDCP PDU in which a data portion is ciphered using a key used before PDCP re-establishment. It applies only in a case where an upper layer requests the PDCP re-establishment for an LWA bearer whose LWA configuration is maintained in the same WT.

When the upper layer requests the PDCP re-establishment for the LWA bearer whose LWA configuration is maintained in the same WT (i.e., handover without a WT change), the UE operates as follows:

Compiles an LWA end-marker PDCP Control PDU by setting an LSN field to the PDCP SN of a last PDCP data PDU to which the PDCP SN relates, and after forwarding a PDCP data PDU corresponding to the LSN to a lower layer, forwards the LWA end-marker PDCP control PDU to the lower layer as a next PDCP PDU to be transmitted.

Begins to use a key provided by the upper layer during a re-establishment procedure for ciphering of a data portion of an uplink PDCP PDU(s) associated with a count value that is greater than a count value corresponding to the LSN.

When the upper layer requests the PDCP re-establishment for the LWA bearer whose LWA configuration is maintained in the same WT (i.e., handover without the WT change), after the LWA end-marker PDCP control PDU is received, the UE begins to use a key provided by the upper layer during a re-establishment procedure for deciphering of a data portion of a downlink PDCP PDU(s) associated with a count value that is greater than a count value corresponding to the LSN.

A Method for Controlling a Loss of an End-Marker During Handover Without a WT Change in eLWA In an eLWA system, handover without a WT change is considered. Unlike a Release-13 system that disconnects a WLAN connection in the handover procedure, maintaining the WLAN connection needs to consider a PDCP key synchronization problem between the UE and the source and target eNBs.

Because the WT continuously forward both UL and DL packets during the handover procedure, a PDCP key for ciphering the packet will be changed from a source eNB PDCP key (PDCP key 1) to a target eNB PDCP key (PDCP key 2) during the handover procedure.

In this case, the UE (in the case of the DL) and the eNB (in the case of the UL) can not distinguish which packet is ciphered with the PDCP key 1 or the PDCP key 2.

In order to solve this problem, it has been proposed to transmit an "End Marker" packet immediately after a last packet ciphered using the PDCP key 1 as described above.

However, even in such a solution, if the "End Marker" packet is lost in the air, it can cause a serious problem in the handover procedure. The "End Marker" defined in this specification differs from an End Marker defined in 3GPP TS 29.281 (for example, version 14.1.0).

In order to prevent such confusion, hereinafter, in this specification, a new "End Marker" (that is, an End Marker used during the handover procedure without the WT change in the eLWA) is referred to as a Key Change Marker or a KCM. However, this is only for convenience of explanation, the KCM referred in this specification may be replaced by an End-Marker or an End-Marker packet or a PDCP control PDU format for the End-Marker packet.

Hereinafter, in the description of the present invention, the terms "PDCP key 1" and "PDCP key 2" are defined as PDCP ciphering keys from the source eNB and the target eNB, respectively.

In the description of the present invention, the PDCP data PDU can be used as an example of a data packet.

Also, to avoid confusion, the term Key Change Marker (KCM) is defined as an end marker that notifies the last packet ciphered with the PDCP key 1.

After receiving the KCM, a receiver can know a PDCP ciphering key information for a received packet during the handover (for example, SN of the last packet ciphered with the PDCP key 1). Here, the KCM may be a newly defined packet or a data packet including an indication bit(s) (for example, an End-Marker packet for LWA). The KCM may also be the same packet as the original End Marker defined in the 3GPP TS 29.281 (for example, the version 14.1.0).

The present invention proposes a method for controlling an error case that can be occurred in the case of a loss of the KCM (or KCM message/packet).

In particular, when the KCM (or KCM message/packet) is lost, a method of requesting KCM retransmission is proposed.

The present invention is applicable to both the DL and UL.

According to the present invention, a "KCM Request" can be defined as a message for requesting the KCM retransmission.

To trigger the KCM retransmission, in the present invention, a method of triggering the KCM retransmission and a method of responding to a failure case of the KCM retransmission are proposed.

To use the KCM and KCM Request, the following procedure can be used.

FIG. 9 is a diagram illustrating a handover procedure according to an embodiment of the present invention.

A procedure illustrated in FIG. 9 may be performed by a UE in relation to a downlink DL during a handover procedure (for example, handover without a WT change), or may be performed by a target eNB in relation to an uplink UL during the handover procedure (for example, handover without the WT change).

Handover (for example, handover without a WT change) starts (S901).

At this time, when the handover (for example, the handover without the WT change) is started, the UE or the target eNB may receive a PDCP data PDU(s). That is, in the case of the DL, the UE may receive the PDCP data PDU(s) from a source eNB or the target eNB via a WT. In the case of the UL, the target eNB may receive the PDCP data PDU(s) from the WT.

If a KCM (i.e., End Marker) has already been received, the UE (in the case of the DL) or the target eNB (in the case of the UL) deciphers the PDCP data PDU(s) using an appropriate PDCP key. In other words, the UE (in the case of the DL) or the target eNB (in the case of the UL) deciphers the PDCP data PDU(s) having an SN equal to or less than (or previous) the SN of the KCM (i.e., End Marker) using PDCP key 1, and deciphers the PDCP data PDU(s) having an SN greater than (or later than) the SN of the KCM (i.e. End Marker) using PDCP key 2.

On the other hand, otherwise (if no KCM (i.e., End Marker) has been received), the UE (in the case of the DL) or the target eNB (in the case of the UL) stores the received PDCP data PDU(s).

When the procedure of FIG. 9 is performed by the UE, in step S901, the UE can know that the handover (for example, the handover without the WT change) procedure has started by receiving a handover command message from the source eNB. Alternatively, in step S901, the UE can know that the handover (for example, the handover without the WT change) procedure has started by performing a random access procedure with the target eNB. Alternatively, in step S901, the UE can know that the handover (for example, the handover without the WT change) procedure has started by transmitting an RRC connection reconfiguration complete message to the target eNB.

When the procedure of FIG. 9 is performed by the target eNB, in step S901, the target eNB can know that the handover (for example, the handover without the WT change) procedure has started by receiving a handover request message from the source eNB. Alternatively, in step 1, in step S901, the target eNB can know that the handover (for example, the handover without the WT change) procedure has started by transmitting a handover request acknowledgment message to the source eNB. Alternatively, in step S901, the target eNB can know that the handover (for example, the handover without the WT change) procedure has started by an established radio interface (for example, a Uu interface) with the UE. Alternatively, in step S901, the target eNB can know that the handover (for example, the handover without the WT change) procedure has started by receiving the RRC connection reconfiguration complete message from the UE. Alternatively, in step S901, the target eNB can know that the handover (for example, the handover without the WT change) procedure has started by receiving an SN Status Transfer message from the source eNB. Alternatively, in step S901, the target eNB can know that the handover (for example, the handover without the WT change) procedure has started by receiving an end marker from the source eNB.

The UE (in the case of the DL) or the target eNB (in the case of the UL) detects (or determines) whether the KCM is lost (S902).

If the UE (in the case of the DL) or the target eNB (in the case of the UL) receives the KCM (i.e., if it determines that the KCM has not been lost), the stored PDCP data PDU(s) are deciphered using the appropriate PDCP key (S903).

As described above, the UE (in the case of the DL) or the target eNB (in the case of the UL) deciphers the PDCP data PDU(s) having an SN equal to or less than (or previous) the SN of the KCM (i.e., End Marker) using the PDCP key 1, and deciphers the PDCP data PDU(s) having an SN greater than (or later than) the SN of the KCM (i.e. End Marker) using the PDCP key 2.

On the other hand, if the UE (in the case of the DL) or the target eNB (in the case of the UL) detects a loss of the KCM (i.e., if it determines that the KCM is lost), the UE (in the case of the DL) or the target eNB (in the case of the UL) transmits a KCM Request (or KCM Request message/packet) (i.e., End Marker Request) to the target eNB (in case of the DL) or the UE (in case of the UL) to request a retransmission of the KCM (S904).

At this time, the UE (in the case of the DL) or the target eNB (in the case of the UL) may transmit the KCM Request to the target eNB (in case of the DL) or the UE (in case of the UL) directly or via the WT.

Here, the KCM Request (message/packet) may be transmitted in one of the following forms:

PDCP control PDU,

A PDCP data PDU including a header indicating a KCM request (i.e., an end marker request), Indicating a KCM request in an LWAAP header, or Signaling using an RRC message.

As described above, the KCM (i.e., End Marker) is transmitted by the eNB in the case of the DL and by the UE in the case of the UL.

If the loss of the KCM is detected, the KCM Request message can be transmitted in the following procedure.

1) In case of downlink,

The target eNB has information of the KCM as follows:

The source eNB may simultaneously share the KCM with the target eNB when the source eNB transmits the KCM to the UE.

Alternatively, when the target eNB generates a first PDCP data PDU ciphered with the PDCP key 2 (i.e., a PDU having an SN_target_first value as the SN), the target eNB may calculate the KCM. At this time, the SN of the KCM is equal to SN=SN_target_first−1 and corresponds to the SN of a last packet ciphered with the PDCP key 1.

The UE requests a KCM retransmission to the target eNB by transmitting the KCM Request message.

By receiving the KCM Request message, the target eNB can forward the KCM message to the UE.

2) In Case of Uplink

The target eNB may transmit the KCM Request message to the UE to request the KCM retransmission.

When the UE receives the KCM Request message, the UE may retransmit the KCM message to the target eNB.

A more detailed description of how the UE or the target eNB determines that the KCM is lost will be described later.

After transmitting the KCM Request, the UE (in the case of the DL) or the target eNB (in the case of the UL) detects whether the KCM has been received (S905).

If the UE (in the case of the DL) or the target eNB (in the case of the UL) receives the KCM, it deciphers the stored PDCP data PDU(s) using the appropriate PDCP key.

As described above, the UE (in the case of the DL) or the target eNB (in the case of the UL) deciphers the PDCP data PDU(s) having an SN less than (or previous) the SN of the KCM (i.e., End Marker) using the PDCP key 1, and deciphers the PDCP data PDU(s) having an SN greater than (or later than) the SN of the KCM (i.e. End Marker) using the PDCP key 2.

On the other hand, if the KCM is not received even after transmitting the KCM Request, the UE (in the case of the DL) or the target eNB (in the case of the UL) may perform a recovery procedure (S906).

Alternatively, the UE (in the case of the DL) or the target eNB (in the case of the UL) may return to step S904 and retransmit the KCM Request. In this case, the above-described steps can be repeatedly performed. Also, the number of retransmissions of the KCM Request may be limited to be transmitted by a predetermined number of times. In this case, if the KCM is not received even after the KCM Request is transmitted by the predetermined number of times, the UE (in case of the DL) or the target eNB (in case of the UL) may perform the recovery procedure.

Hereinafter, a method of detecting the loss of the KCM will be described in step S904 of FIG. 9. The loss of the KCM may be detected in the following method.

1) Method 1

When the handover procedure has been successfully started and the KCM has not yet been received, and when an available space for storing the received data packet(s) is less than a predefined threshold, the UE or the target eNB may consider it the loss of the KCM and transmit the KCM request.

2) Method 2

When the handover procedure has been successfully started and the KCM has not yet been received, the UE or the target eNB may detect the loss of the KCM based on a result of calculation using the SN of each packet (e.g., PDCP data PDU).

This will be described in detail.

Step 1: When the handover procedure has been successfully started and the KCM has not yet been received, the UE or the target eNB may calculate the SN (Used_SN) used for each stored packet in the following manner:

If a value obtained by subtracting a last submitted PDCP receiving SN (Last_Submitted_PDCP_RX_SN) from a next PDCP receiving SN (Next_PDCP_RX_SN) is 0 or more, the Used_SN may be calculated as shown in Equation 1 below.

Here, the Next_PDCP_RX_SN indicates a next expected PDCP SN by a receiver for a given PDCP entity. Upon establishing the PDCP entity, the UE sets the Next_PDCP_RX_SN to zero.

And, in the PDCP entity for a DRB(s) mapped to an RLC AM, the Last_Submitted_PDCP_RX_SN indicates the SN of a last PDCP SDU forwarded to an upper layer. Upon establishing the PDCP entity, the UE sets the Last_Submitted_PDCP_RX_SN to a maximum PDCP SN (Maximum_PDCP_SN).

Here, the Maximum_PDCP_SN is 262143 when the PDCP entity is configured to use an 18-bit SN, 65535 when the PDCP entity is configured to use an 16-bit SN, 32767 when the PDCP entity is configured to use an 15-bit SN, 4095 when the PDCP entity is configured to use an 12-bit SN, 127 when the PDCP entity is configured to use an 7-bit SN, and 31 when the PDCP entity is configured to use an 5-bit SN.

$$\text{Used\_SN} = \text{Next\_PDCP\_RX\_SN} - \text{Last\_Submitted\_PDCP\_RX\_SN} \quad \text{[Equation 1]}$$

On the other hand, if the value obtained by subtracting the last submitted PDCP receiving SN (Last_Submitted_PDCP_RX_SN) from the next PDCP receiving SN (Next_PDCP_RX_SN) is less than 0, the Used_SN may be calculated as shown in Equation 2 below.

$$\text{Used\_SN} = \text{Maximum\_PDCP\_SN} - \text{Next\_PDCP\_RX\_SN} + \text{Last\_Submitted\_PDCP\_RX\_SN} \quad \text{[Equation 2]}$$

Step 2: If the Used_SN exceeds a predefined threshold, the UE or the target eNB may consider it the loss of the KCM and transmit the KCM request.

3) Method 3

When the handover procedure has been successfully started and the KCM has not yet been received (or when the handover procedure has been successfully started), when the UE or the target eNB drives a predefined timer and does not receive the KCM until the timer expires, the KCM may be regarded as a loss.

This will be described in more detail with reference to the following drawings.

FIG. 10 is a diagram illustrating a method of detecting a loss of an end marker packet (KCM) according to an embodiment of the present invention.

Referring to FIG. 10, when a handover procedure is triggered successfully (S1001), when the handover procedure has been successfully started and a KCM has not yet been received, a UE or a target eNB may detect a loss of the KCM based on a result of calculation using an SN of each packet (e.g., PDCP data PDU).

It is determined whether the KCM is received (S1002).

When the KCM has been received, this procedure is terminated.

On the other hand, when the KCM has not yet been received, the UE or the target eNB starts a KCM timer (S1003), and the UE or the target eNB determines whether the KCM is received (S1004).

Alternatively, when the handover procedure has successfully started (S1001), the UE or the target eNB may start the KCM timer.

Also, the UE or the target eNB determines whether the KCM timer expires (S1005), and the UE or the target eNB continuously determines whether the KCM is received until the KCM timer expires (S1004).

When a KCM packet is received before the KCM timer expires, the UE or the target eNB stops the KCM timer and terminates the procedure (S1006).

On the other hand, when the KCM packet has not been received until the KCM timer expires, the UE or the target eNB may consider it the loss of the KCM and transmit a KCM request (S1007).

Hereinafter, in step S906 of FIG. 9, when the UE or the target eNB performs a recovery procedure for the loss of the KCM, the recovery procedure will be described.

When the KCM is not received after the KCM request is transmitted, the UE or the target eNB may perform the recovery procedure for the loss of the KCM as follows:

1) Option 1

A sequence number (SN) is defined as a cyclic order.

1-1) In Case of Downlink

The UE defines a old last SN (SN_old_last) as a largest sequence number of a data packet received from a source eNB through a radio interface (for example, a Uu interface).

At this time, if a sequence number of a data packet received through a WLAN is less than the SN_old_last, the UE deciphers the packet with a PDCP key 1.

Also, if the sequence number of the data packet received through the WLAN is SN_old_last+1, the UE deciphers the packet with the PDCP key 1.

Also, when a data packet having a specific sequence number SN is deciphered with the PDCP key 1 and another packet having a sequence number SN+1 is stored, the UE deciphers the packet having the sequence number SN+1 with the PDCP key 1.

In summary, the UE can decipher a data packet having an SN less than a largest SN of a data packet directly received from the source eNB with the PDCP key 1. And, the UE can decipher a data packet having an SN greater than the largest SN of the data packet directly received from the source eNB and having a continuous SN with the PDCP key 1.

The UE defines a new first SN (SN_new_first) as a smallest sequence number of the data packet received from the target eNB through the radio interface (for example, the Uu interface).

At this time, if the sequence number of the data packet received through the WLAN (i.e., from a WT) is greater than the SN_new_first, the UE deciphers the packet with a PDCP key 2.

Also, if the sequence number of the data packet received through the WLAN is SN_new_first−1, the UE deciphers the packet with the PDCP key 2.

Also, when a data packet having a specific sequence number SN is deciphered with the PDCP key 2 and another packet having a sequence number SN−1 is stored, the UE deciphers the packet having the sequence number SN−1 with the PDCP key 2.

In summary, the UE can decipher a data packet having an SN greater than a smallest SN of a data packet directly received from the target eNB with the PDCP key 2. And, the UE can decipher a data packet having an SN less than the smallest SN of the data packet directly received from the target eNB and having a continuous SN with the PDCP key 2.

The UE discards any remaining data packets that were received through the WLAN.

1-2) In Case of Uplink

The target eNB defines a Uu first SN (SN_Uu_first) as a smallest sequence number of the data packet received from the UE through the radio interface (for example, the Uu interface).

At this time, if a sequence number of a data packet received from the WT through an Xw interface is greater than the SN_Uu_first, the target eNB deciphers the packet with the PDCP key 2.

Also, if the sequence number of the data packet received from the WT through the Xw interface is SN_Uu_first−1, the target eNB deciphers the packet with the PDCP key 2.

Also, when the data packet having the specific sequence number SN is deciphered with the PDCP key 2 and another packet having a sequence number SN−1 is stored, the target eNB deciphers the packet having the sequence number SN−1 with the PDCP key 2.

In summary, the target eNB can decipher a data packet having an SN greater than a smallest SN of a data packet directly received from the UE with the PDCP key 2. And, the target eNB can decipher a data packet having an SN less than the smallest SN of the data packet directly received from the UE and having a continuous SN with the PDCP key 2.

The eNB discards stored remaining data packets that were received through the Xw interface from the WT.

2) Option 2

A sequence number (SN) is defined as a cyclic order.

2-1) In Case of Downlink

The UE defines a new first SN (SN_new_first) as a smallest sequence number of a data packet received from the target eNB through the Uu interface.

At this time, if the sequence number of the data packet received through the WLAN is smaller than the SN_new_first, the UE discards the packet.

That is, the UE can discard a data packet having an SN smaller than the smallest SN of the data packet directly received from the target eNB.

2-2) In Case of Uplink

The target eNB defines the Uu first SN (SN_Uu_first) as the smallest sequence number of the data packet received from the UE through the Uu interface.

At this time, if the sequence number of the data packet received from the UE through the Uu interface is smaller than the SN_Uu_first, the target eNB discards the packet.

That is, the target eNB can discard a data packet having an SN smaller than the smallest SN of the data packet directly received from the UE.

Overview of Devices to Which the Present Invention can be Applied

FIG. 11 illustrates a block diagram of a communication device according to an embodiment of the present invention.

With reference to FIG. 11, a wireless communication system comprises a network node or eNB 1110 and a plurality of UEs 1120.

The network node or eNB 1110 comprises a processor 1111, a memory 1112, and a communication module 1113. The processor 1111 implements functions, processes and/or methods proposed through FIG. 1 to FIG. 10. The processor 1111 can implement layers of wired/wireless interface protocol. The memory 1112, being connected to the processor 1111, stores various types of information for driving the processor 1111. The communication module 1113, being connected to the processor 1111, transmits and/or receives wired/wireless signals. Examples of the network node 1110 include WT, MME, S-GW and so on. In particular, in case the network node 1110 is a base station, the communication module 1113 can include a Radio Frequency (RF) unit for transmitting/receiving a radio signal.

The UE 1120 comprises a processor 1121, a memory 1122, and a communication module (or RF unit) 1123. The processor 1121 implements functions, processes and/or methods proposed through FIG. 1 to FIG. 10. The processor 1121 can implement layers of wireless interface protocol. The memory 1122, being connected to the processor 1121, stores various types of information for driving the processor 1121. The communication module 1123, being connected to the processor 1121, transmits and/or receives wireless signals.

The memory 1112, 1122 can be installed inside or outside the processor 1111, 1121 and can be connected to the processor 1111, 1121 through various well-known means. Also, the network node 1110 (in the case of the base station) and/or the UE 1120 can have a single antenna or multiple antennas.

FIG. 12 illustrates a block diagram of a communication device according to an embodiment of the present invention.

Particularly, in FIG. 12, the UE described above FIG. 11 will be exemplified in more detail.

Referring to FIG. 12, the UE includes a processor (or digital signal processor: DSP) 1210, an RF module (or RF unit) 1235, a power management module 1205, an antenna 1240, a battery 1255, a display 1215, a keypad 1220, a memory 1230, a subscriber identification module (SIM) card 1225 (which may be optional), a speaker 1245 and a microphone 1250. The UE may include a single antenna or multiple antennas.

The processor 1210 implements the functions, procedures and/or methods proposed in FIGS. 1 to 10. Layers of a wireless interface protocol may be implemented by the processor 1210.

The memory 1230 is connected to the processor 1210 and stores information related to operations of the processor 1210. The memory 1230 may be located inside or outside the processor 1210 and may be connected to the processors 1210 through various well-known means.

A user enters instructional information, such as a telephone number, for example, by pressing (or touching) buttons of a keypad 1220 or by voice activation using the microphone 1250. The processor 1210 receives and processes the instructional information to perform the appropriate function, such as to dial the telephone number. Operational data may be extracted from the SIM card 1225 or the memory 1230. Furthermore, the processor 1210 may display the instructional and operational information on the display 2615 for the user's reference and convenience.

The RF module 1235 is connected to the processor 1210, transmits and/or receives an RF signal. The processor 1210 forwards instructional information to the RF module 1235, to initiate communication, for example, transmit radio signals comprising voice communication data. The RF module 1235 comprises a receiver and a transmitter to receive and transmit the radio signals. The antenna 1240 facilitates the transmission and reception of the radio signals. Upon receiving the radio signals, the RF module 1235 may forward and convert the signals to baseband frequency for processing by the processor 1210. The processed signals would be converted into audible or readable information outputted via the speaker 1245.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is applied to a 3GPP LTE/LTE-A system is primarily described, but can be applied to various wireless communication systems in addition to the 3GPP LTE/LTE-A system.

The invention claimed is:

1. A method for performing handover by a user equipment (UE) without a wireless local area network (WLAN) termination (WT) change from a source eNodeB (eNB) to a target eNodeB (eNB) in a wireless communication system, the method comprising:
transmitting an end-marker request for requesting retransmission of an end-marker packet to the target eNB when a loss of the end-marker packet is detected after the handover without the WT change has started; and
retransmitting the end-marker request or performing a recovery procedure for the end-marker packet when the end-marker packet is not received from the target eNB after the transmission of the end-marker request,
wherein when the handover procedure without the WT change is successfully started, starting a predefined timer, and
wherein when the end-marker packet is not received prior to expiration of the predefined timer, determining the end-marker packet is lost.

2. The method of claim 1, wherein when the handover without the WT change is started, a packet data convergence protocol (PDCP) data protocol data unit (PDU) is received from the source eNB or the target eNB.

3. The method of claim 2, wherein when the end-marker packet is received, a PDCP data PDU having a sequence number (SN) equal to or less than an SN of the end-marker packet is deciphered using a first PDCP key of the source eNB, and
a PDCP data PDU having an SN greater than the SN of the end-marker packet is deciphered using a second PDCP key of the target eNB.

4. The method of claim 2, wherein the recovery procedure includes:
deciphering a PDCP data PDU having a sequence number greater than a largest sequence number of the PDCP data PDU received directly from the source eNB and having a continuous sequence number using a first PDCP key of the source eNB;
deciphering a PDCP data PDU having a sequence number less than a smallest sequence number of the PDCP data PDU received directly from the target eNB and having a continuous sequence number using a second PDCP key of the target eNB; and
discarding remaining PDCP data PDUs stored in the UE.

5. The method of claim 2, wherein the recovery procedure includes discarding a PDCP data PDU having a sequence number less than a smallest sequence number of the PDCP data PDU directly received from the target eNB.

6. The method of claim 1, wherein the end-marker request is transmitted by a packet data convergence protocol (PDCP) control protocol data unit (PDU), a PDCP data PDU, an LTE-WLAN aggregation adaptation protocol (LWAAP) header, or a radio resource control (RRC) message.

7. The method of claim 1, wherein the UE determines that the handover without the WT change starts by receiving a handover command message from the source eNB, performing a random access procedure with the target eNB, or transmitting an RRC connection reconfiguration complete message to the target eNB.

* * * * *